(12) United States Patent
Beppu

(10) Patent No.: US 6,870,700 B2
(45) Date of Patent: Mar. 22, 2005

(54) MOTOR CONTROL METHOD FOR MAGNETIC DISK DRIVE

(75) Inventor: Osamu Beppu, Oiso (JP)

(73) Assignee: Hitachi, Ltd., Tokyo (JP)

(*) Notice: Subject to any disclaimer, the term of this patent is extended or adjusted under 35 U.S.C. 154(b) by 192 days.

(21) Appl. No.: 10/377,897

(22) Filed: Feb. 28, 2003

(65) Prior Publication Data

US 2003/0227706 A1 Dec. 11, 2003

(30) Foreign Application Priority Data

Jun. 5, 2002 (JP) .................................... 2002-164332

(51) Int. Cl.$^7$ .............................................. G11B 19/20
(52) U.S. Cl. ................................... 360/73.03; 318/254
(58) Field of Search ............................... 360/73.03, 69, 360/71; 318/254, 268, 272, 276, 277, 278, 439, 560, 561

(56) References Cited

U.S. PATENT DOCUMENTS

| | | | |
|---|---|---|---|
| 5,471,353 A | | 11/1995 | Codilian et al. ......... 360/73.03 |
| 6,078,158 A | * | 6/2000 | Heeren et al. ........... 360/73.03 |
| 6,169,381 B1 | * | 1/2001 | Arai et al. .............. 360/73.03 |
| 6,201,657 B1 | * | 3/2001 | Shimizu et al. .......... 360/73.03 |
| 6,633,450 B1 | * | 10/2003 | Kaneko .................. 360/73.03 |
| 6,753,667 B2 | * | 6/2004 | Sakamoto ................ 318/433 |

FOREIGN PATENT DOCUMENTS

JP 2220283 4/1991

* cited by examiner

Primary Examiner—Andrew L. Sniezek
Assistant Examiner—James L Habermehl
(74) Attorney, Agent, or Firm—Townsend and Townsend and Crew LLP

(57) ABSTRACT

The motor drive method is for a magnetic disk drive apparatus having a magnetic disk as an information recording medium, a magnetic head for recording/reproducing information to/from the magnetic disk, and a motor for driving the magnetic disk, the motor having a connection point connecting middle points in a multi-phase Y-connection and capable of realizing a unipolar drive method for successively exciting phases and a bipolar drive method for simultaneously exciting two adjacent phases, wherein the unipolar drive method is selected when the temperature in the magnetic disk drive apparatus is lower than a predetermined temperature and the bipolar drive method is selected when the temperature exceeds the predetermined temperature. The motor stationary rotation is assured by selecting the unipolar drive method or the bipolar drive method.

8 Claims, 6 Drawing Sheets

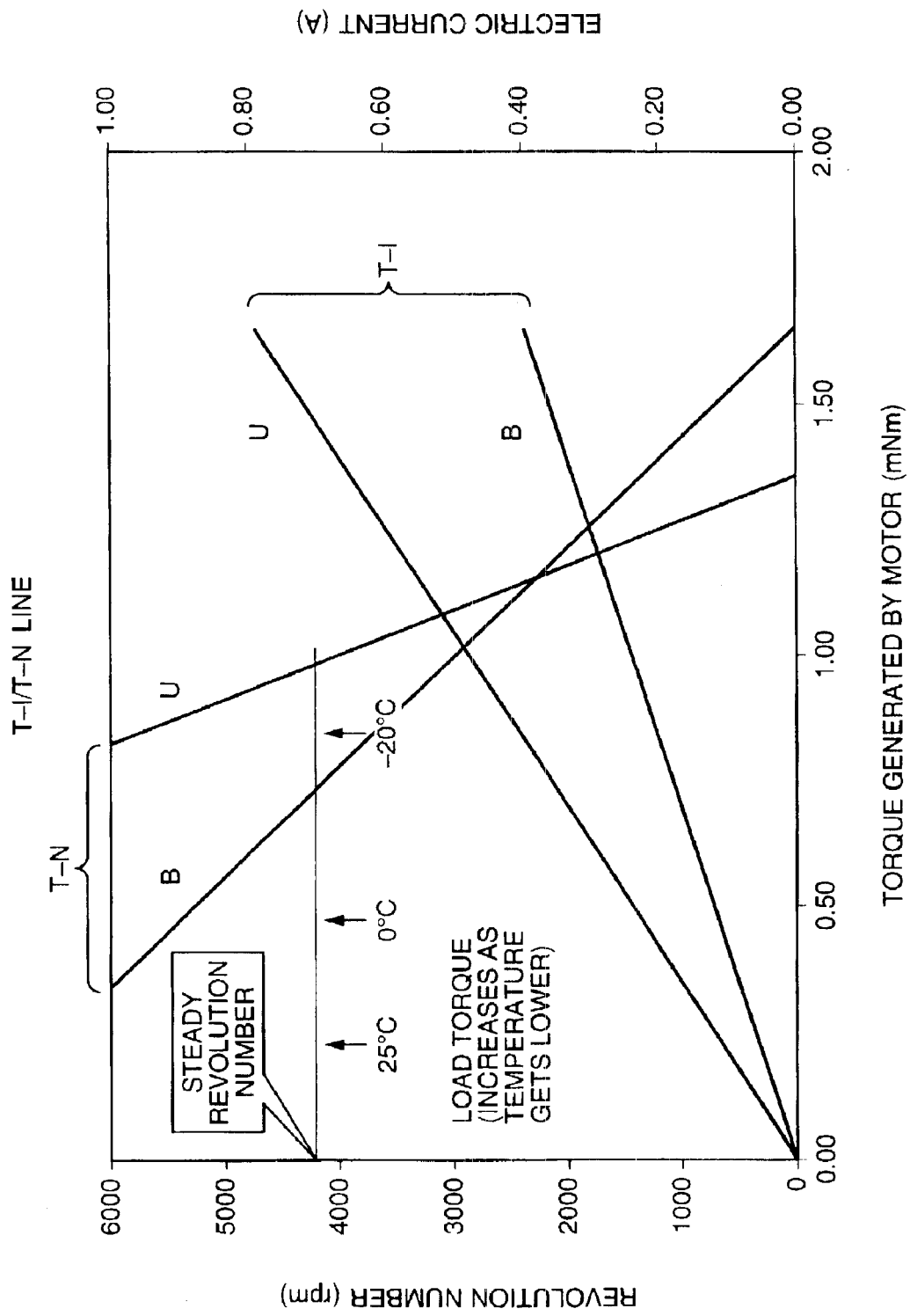

BIPOLAR-DRIVE CONTROL

UNIPOLAR-DRIVE CONTROL (1) BIPOLAR-DRIVE CONTROL (2) UNIPOLAR-DRIVE CONTROL

MOTOR CONTROL METHOD FOR MAGNETIC DISK DRIVE

BACKGROUND OF THE INVENTION

1. Field of the Invention

The present invention relates to a magnetic disk apparatus used for recording/reproducing information and in particular, to a magnetic disk apparatus drive method when the magnetic disk apparatus is mounted on a vehicle such as an automobile where strict environmental conditions including operation temperature are required.

2. Description of the Related Art

The start torque required for starting a spindle motor is increasing as the number of magnetic disks increases in a magnetic disk apparatus and as the contact start/stop (CSS) method is employed. Japanese Patent Publication 2796333 diskloses a conventional technique for satisfying this requirement. According to this Publication, the spindle motor has a 3-phase Y-connected coil and a pulling line is provided in each of the coil phases, so that the number of windings of a stator is switched from one to another for controlling the motor. More specifically, in order to obtain a large torque required upon start, all the regions of the n windings are used upon start and during a process to reach a stationary rotation, the pulling line is used to switch to a partial region of the stator windings.

Moreover, the specification of U.S. Pat. No. 5,471,353 diskloses a technique for switching the drive method from one to another during a process to motor stationary rotation in a disk apparatus having a plurality of motor drive methods. According to this specification, the spindle motor has two or more coil windings for driving the spindle motor in unipolar mode and bipolar mode. More specifically, upon starting a disk drive, the bipolar mode is used and during the stationary rotation, the unipolar mode is used. Thus, upon starting the motor, it is possible to use the bipolar mode having a low current and a large torque. That is, by employing the bipolar drive method, it is possible to obtain a large torque upon start and in the process of rising, the mode is switched to the unipolar drive method, thereby enabling stationary rotation while suppressing the counter electromotive force.

It is assumed that a magnetic disk apparatus used as an external storage device is normally mounted on a personal computer and the temperature range for assuring operation is specified. For example, the conventional magnetic disk apparatus can work within a temperature range of 5 to 55 degrees C.

Recently, the magnetic disk apparatus has begun to be used in a portable device other than the personal computer and its use range is increasing. For this, the temperature range is also increased as compared to the conventional condition. For example, in a navigation system mounted on an automobile, the temperature condition is very strict and the magnetic disk apparatus has an operation temperature range of—30 to 85 degrees C.

On the other hand, the spindle motor for rotating a magnetic disk has conventionally used a ball bearing but now a structure using fluid dynamic bearing (FDB) is also used in practice in accordance with reduction in size and thickness of the apparatus. When rotating the motor having these bearings, grease used for the bearings has oil viscosity depending on the temperature and accordingly, the rotation load has a temperature characteristic. Especially when the temperature is low, the load increases and a large torque is required as compared to the normal temperature condition as the normal use state.

The spindle motor of the magnetic disk apparatus is a DC motor. In order to cover the aforementioned load fluctuation range, the motor should have such a torque characteristic that a counter electromotive force constant (equivalent to a torque constant) is lowered for the torque required at a low temperature, thereby assuring a large voltage margin (difference generated between the motor torque characteristic and the load characteristic) (which will be detailed later). Since this means that the torque constant is lowered, the motor drive current increases, resulting in a motor having a large power consumption. A portable device requires a reduced power consumption and the increase of the motor drive current is a problem to be solved.

Moreover, Japanese Patent Publication 2796333 shown as a conventional technique diskloses how to assure a large torque required upon motor start and a rotation margin during a stationary rotation but does not consider the torque generation required during a stationary rotation at a low temperature or reduced power consumption (drive current reduction) at a normal temperature. Furthermore, the aforementioned US patent specification diskloses an apparatus having a plurality of motor drive methods so as to employ the bipolar drive method upon start and the unipolar drive method to be switched during a start process and does not solve the problem concerning the stationary rotation at a low temperature.

SUMMARY OF THE INVENTION

It is therefore an object of the present invention to provide a motor drive method assuring a increase of torque generation at a low temperature and a margin of stationary rotation at a low temperature as well as reduced power consumption during stationary rotation at a normal temperature.

In order to achieve the aforementioned object, the present invention has configuration as follows.

A motor drive method for a magnetic disk apparatus comprising a magnetic disk as an information recording medium, a magnetic head for recording/reproducing information to/from the magnetic disk, and a motor for driving the magnetic disk, the motor having a connection point for connecting middle points in the multi-phase Y-connection and using a unipolar drive method for successively exciting the phases and a bipolar drive method for simultaneously exciting two adjacent phases, wherein if the temperature in the magnetic disk apparatus is lower than a predetermined temperature, the unipolar drive method is selected and if the temperature exceeds the predetermined temperature, the bipolar drive method is selected.

Other objects, features and advantages of the invention will become apparent from the following description of the embodiments of the invention taken in conjunction with the accompanying drawings.

BRIEF DESCRIPTION OF THE DRAWINGS

FIG. 4 shows the torque-revolution number curve and the torque-drive current curve in a bipolar drive method (B curve) and unipolar drive method (U curve) in a 3-phase Y-connection motor according to the present embodiment.

DESCRIPTION OF THE EMBODIMENTS

Figure 1:
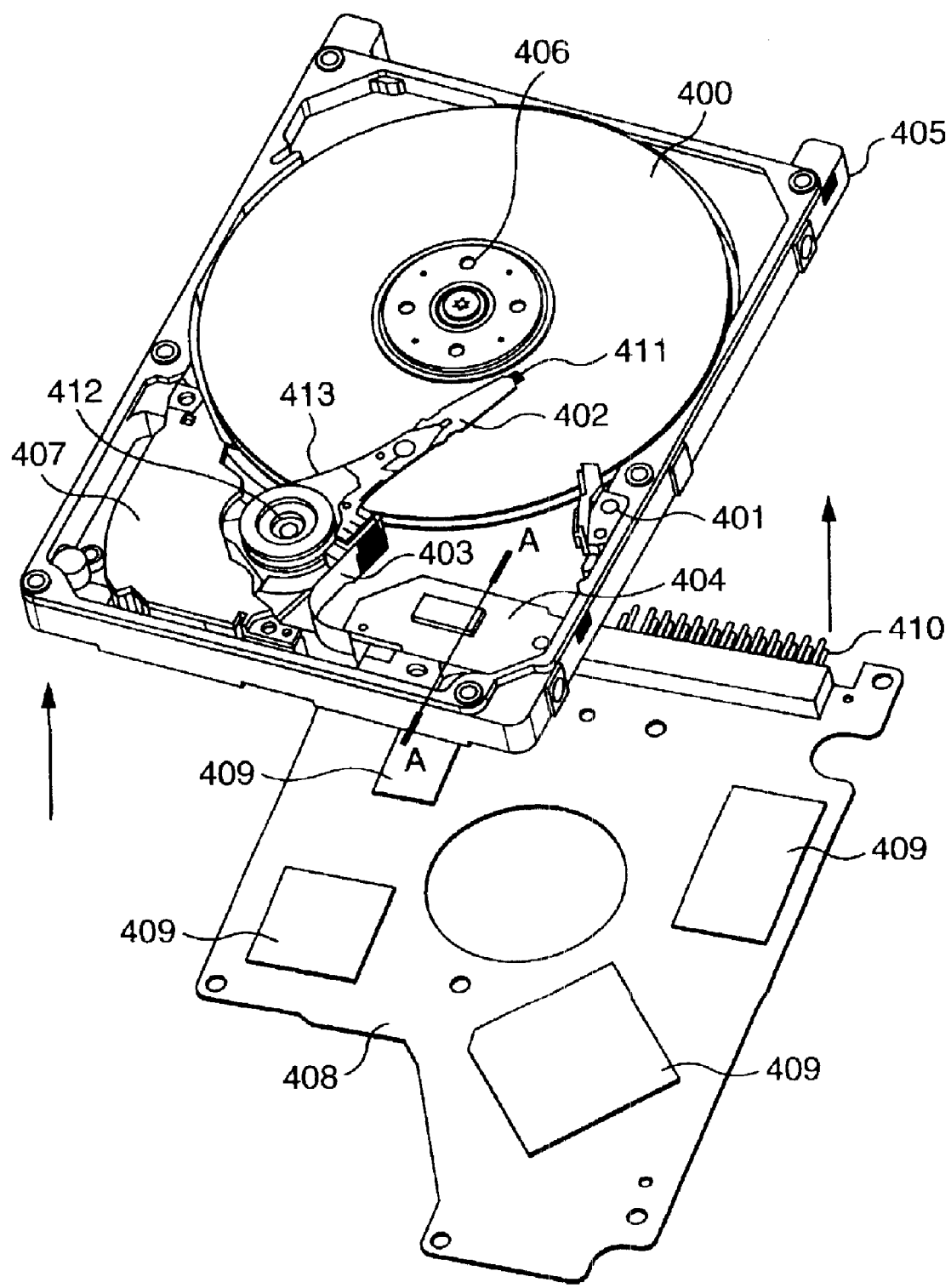
FIG. 1 shows the entire configuration of a magnetic disk apparatus according to an embodiment of the present invention.

Description will now be directed to a magnetic disk apparatus motor drive method according to an embodiment of the present invention with reference to FIG. 1 to FIG. 7. FIG. 1 shows the entire configuration of the magnetic disk apparatus according to the embodiment of the present invention.

FIG. 1 is a perspective view of a 2.5 type magnetic disk apparatus mounted on a conventional notebook personal computer. In this magnetic disk apparatus, a spindle motor (not depicted) is pressed into or adhered to a case 405. Furthermore, the spindle motor has a hub portion to which two magnetic disks 400 are fixed by a clamp 406 or an adhesive. The magnetic disk 400 normally has a magnetic film formed by sputtering on an aluminum substrate. A shaft of the spindle motor is simplified in the figure. This motor has a rotor 6a and a stator 6b (see FIG. 2). The rotor 6a is rotatably supported inside by a ball bearing or a dynamic bearing.

On the case 405, a carriage 413 is provided. A magnetic head 411 for reading/writing information from/to the magnetic disk is mounted at the end of a suspension 402 of the carriage 413. Furthermore, a pivot 412 gives the carriage 413 a degree of freedom in the radial direction of the magnetic disk 400 and the carriage 413 can be rocked/driven to a predetermined position on the surface of the magnetic disk 400. The case 405 may seal the inner constituent parts completely or have a small breathing hole to provide a semi-seal state.

A signal from the magnetic head 411 is amplified via an FPC (flexible print circuit) 403 by a preamplifier IC 404. Furthermore, the signal is connected to a PCB (printed circuit board) 408 via a connector not depicted, processed by an electronic part 409, and transmitted outside by an external connector 410.

Figure 2:
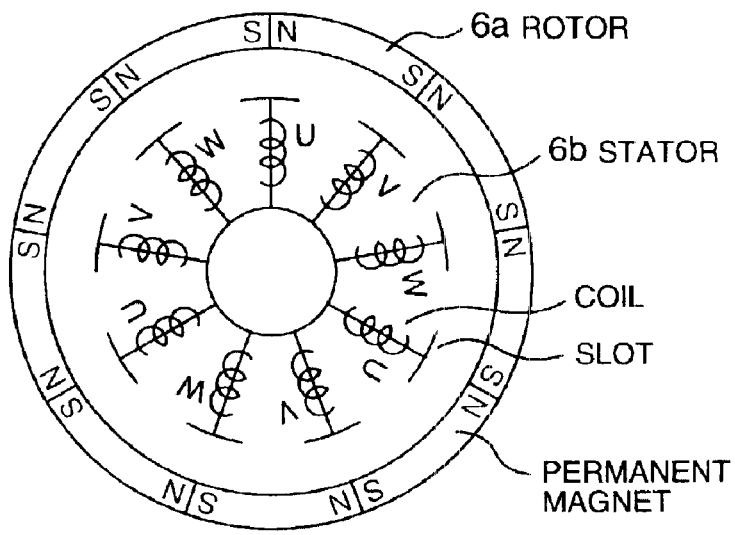
FIG. 2 is a conceptual figure of a spindle motor used in the magnetic disk apparatus according to the present embodiment.

FIG. 2 is a conceptual figure of the spindle motor (hereinafter, referred to as a motor) used in the magnetic disk apparatus according to the present embodiment. A configuration example of the motor 6 will be explained with reference to FIG. 1 and FIG. 2. The motor has a rotor 6a fixed to its shaft and a stator 6b fixed to the case 405. Inside the rotor housing, a cylindrical permanent magnet magnetized identically in the circumferential direction is mounted. The stator 6b is made by punching and laminating a mild steel plate and other magnetic material and has a plurality of slots and magnetic poles at the outer peripheral portion. A coil is wound around each of the magnetic poles. In the configuration example of FIG. 2, there are provided 9 slots and the U-phase, V-phase, and W-phase are successively arranged.

Figure 3:
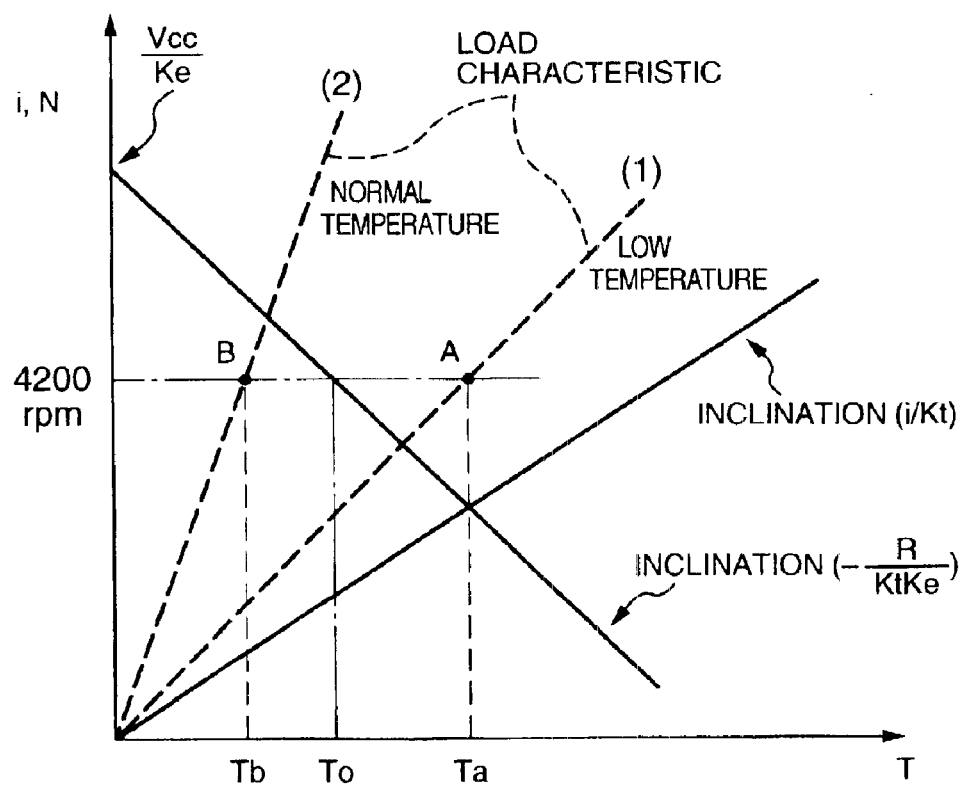
FIG. 3 shows the relationship between the torque and the revolution number and the relationship between the torque and the drive current of a DC motor used in the present embodiment.
Figure 5A:
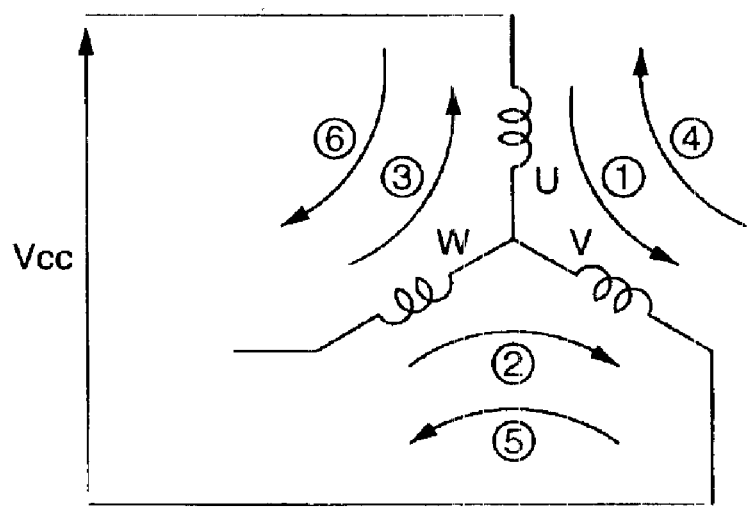
FIG. 5A and FIG. 5B shows drive current in the bipolar drive method and the unipolar drive method in the 3-phase Y-connection DC motor according to the present embodiment.
Figure 5B:
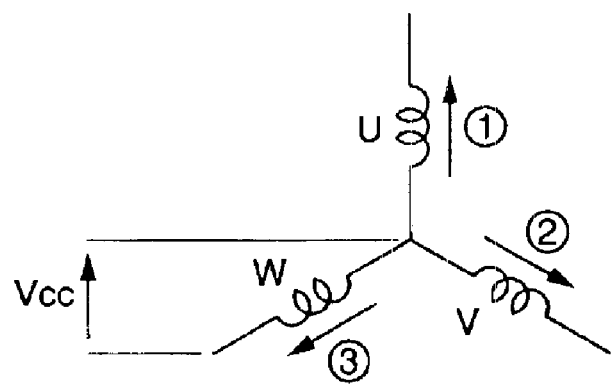

Next, explanation will be given on the type of the motor drive methods according to the embodiment of the present invention and their functions with reference to FIG. 3, FIG. 4, FIG. 5A, and FIG. 5B. FIG. 3 shows the relationship between the torque and the revolution number and the relationship of the torque and the drive current of the DC motor used in the present embodiment. FIG. 4 shows the torque-revolution number curve and the torque-drive current curve in the bipolar drive method (B curve in the figure) and the unipolar drive method (U curve in the figure) in the 3-phase Y-connection motor according to the present embodiment. FIG. 5A and FIG. 5B shows the drive current of the bipolar drive method and the unipolar drive method in the 3-phase Y-connection DC motor according to the present embodiment.

The characteristic of the DC motor shown in FIG. 3 can be shown in an equation as follows:

$$Vcc = Ke \times N + i \times R \qquad (1)$$

$$T = Kt \times i \qquad (2)$$

wherein Vcc represents a constant value of DC voltage applied to the motor, Ke represents a counter electromotive force constant (hereinafter, referred to as a counter constant) defined by the intensity of the magnetic field and the number of coil turns, N represents the revolution number of the motor, i represents a drive current, and R represents a resistance of the coil and the circuit. Moreover, T represents a motor torque and Kt represents a torque constant defined by the intensity of the magnetic field and the number of coil turns. Ke and Kt are substantially equivalent although named differently.

From equation (1) and equation (2), it is possible to obtain equation (3):

$$Vcc = Ke \cdot N + (R/Kt) \times T$$

$$N = -\{R/(Kt \cdot Ke)\} \cdot T + (Vcc/Ke) \qquad (3)$$

FIG. 3 illustrates equation (3) and equation (2). The (T–N) curve has inclination of $\{-R/(Kt \cdot Ke)\}$ and a piece of the N axis is (Vcc/Ke). Moreover, the (T–i) curve has inclination of (1/Kt).

Here, for example, when the magnetic disk apparatus according to the embodiment of the present invention is used in a navigation system mounted on an automobile, the environmental temperature condition is very strict and the temperature range is –30 to 85 degrees C. Especially when the temperature environment of the magnetic disk apparatus is low, if the bearing of the DC motor is fluid dynamic bearing (FDB), the lubrication characteristic of the bearing is different as compared to the one at the normal temperature and the motor rotation load has the temperature characteristic (the same phenomenon occurs in the case of ball bearing although the degree is different). More specifically, at a low temperature, the rotation load is increased as compared to the one at a normal temperature because the viscosity of the FDB bearing oil or grease is increased. The load characteristic of the bearing at a low temperature (1) and at a normal temperature (2) are shown by dotted lines in FIG. 3. It should be noted that the motor rotation load includes a windage loss of the magnetic disk in addition to the bearing load. However, the load by the FDB is greater than the windage loss by several times.

As is clear from the load characteristic of FIG. 3, during a stationary rotation such as 4200 rpm, torque Ta corresponding to point A is required by the load characteristic of a low temperature and at a normal temperature, stationary rotation can be obtained with a torque Tb. In the example of FIG. 3, since the torque Ta required at a low temperature is greater than To (torque generated by the motor itself at stationary rotation of 4200 rpm), stationary rotation cannot be obtained at a low temperature.

In order to assure stationary rotation at a low temperature, the motor load characteristic may be changed as (2) in FIG. 3, i.e., the load is lowered. More specifically, in the case of ball bearing, the grease viscosity is lowered and in the case of FDB, the fluid viscosity is lowered. However, if the viscosity is lowered, the pressure required for supporting the rotational body by the FDB at a high temperature of the magnetic disk apparatus may be insufficient. When the pressure is insufficient, the axis fluctuation by an external vibration may be increased or the bearing is brought into contact and wears, lowering the reliability of the magnetic disk apparatus.

Moreover, in order to assure the stationary rotation at a low temperature, it is possible to lower the counter constant Ke referencing equation (3) so that the (T–N) curve shown in FIG. 3 goes passing the right side of point A. The lowering of the Ke means the lowering of the torque constant Kt. Since equation (2) and Vcc are constant, the drive current is increased, increasing the power consumption. This does not satisfy the reduced power consumption.

To cope with this, according to the present invention, in the Y-connection DC motor, at a low temperature, the stationary rotation is assured by driving using the unipolar drive method having a low counter constant while at a normal temperature, the bipolar drive method is used to assure a large torque by a low current.

Figure 6:
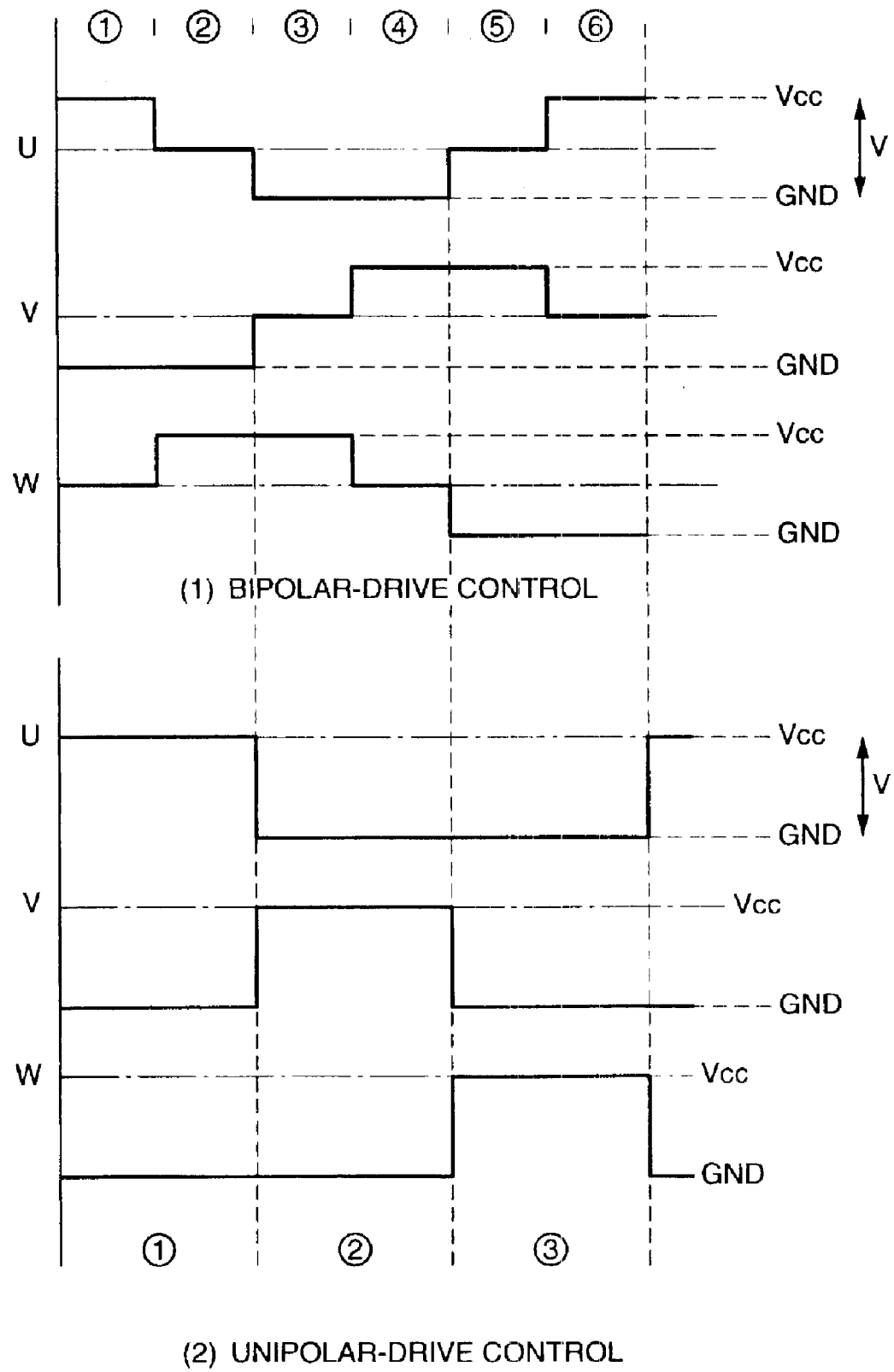
FIG. 6 shows a current waveform of each phase coil in the bipolar drive method and the unipolar drive method in the 3-phase Y-connection DC motor according to the present embodiment.
Figure 7:
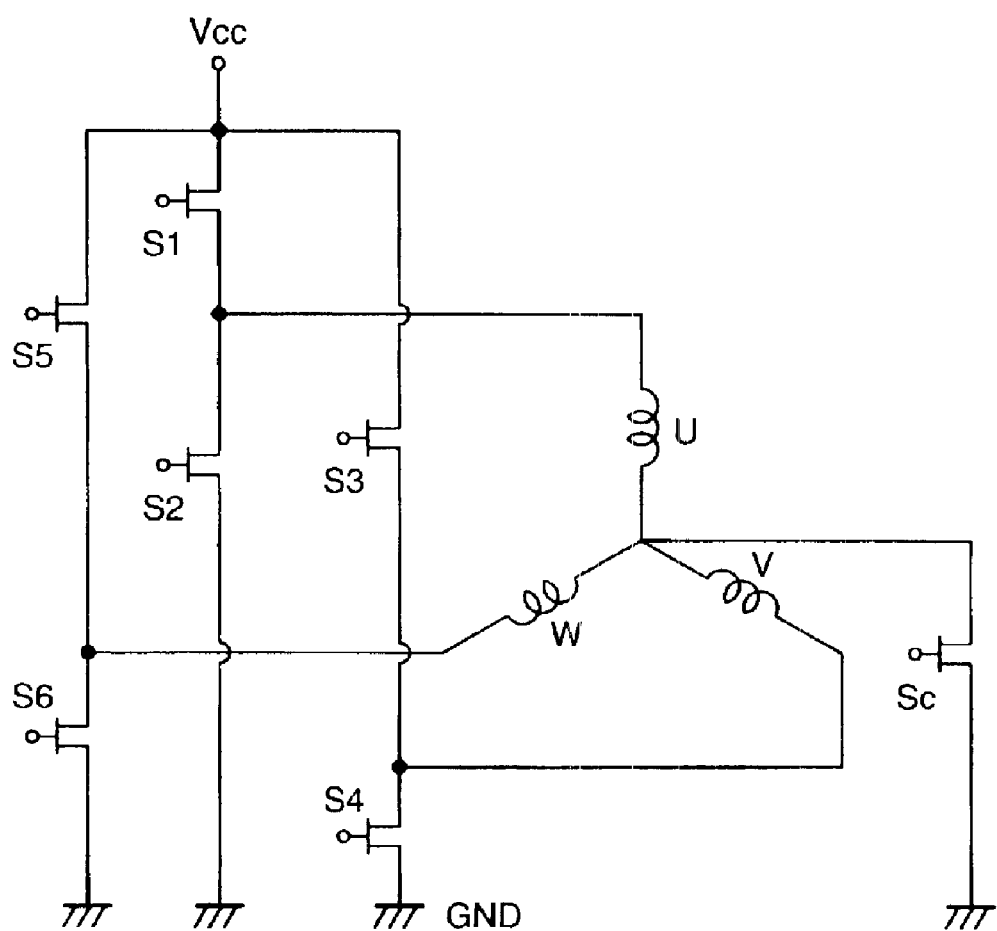
FIG. 7 shows drive method switching between the bipolar drive method and the unipolar drive method and the drive state of each of the drive methods according to the present embodiment.

Hereinafter, specific explanation will be given on the motor drive method according to the embodiment of the present invention with reference to FIG. 4 to FIG. 7. FIG. 4, FIG. 5A, and FIG. 5B are as has been described above. FIG. 6 shows a current waveform of each phase coil in the bipolar drive method and unipolar drive method in the 3-phase Y-connection DC motor according to the present embodiment. FIG. 7 shows the drive method switching between the bipolar drive method and the unipolar drive method and a drive state of each of the drive methods.

Explanation will be given on an example of the structure of stator and rotor of the motor shown in FIG. 2. FIG. 2 shows a 3-phase Y-connection DC motor having U-phase, V-phase, and W-phase of 9 slots. As shown in FIG. 5, the unipolar drive method successively drives the U-phase, V-phase, and W-phase without overlapping, so as to form a current waveform shown in FIG. 6 (2) and excite 3/9 slots in FIG. 5 (2). The bipolar drive method simultaneously drives the U-phase and the V-phase (1), and then simultaneously the W-phase and the V-phase (2), and then simultaneously the W-phase and the U-phase (3). Furthermore, by reversing the drive current direction, the V-phase and the U-phase are driven simultaneously (4), and then the V-phase and the W-phase are driven simultaneously (5), and then the U-phase and W-phase are driven simultaneously (6), thereby forming the current waveform shown in FIG. 6 (1). Thus, current is always applied to two phases (bipolar) of U, V, and W, so as to excite 6/9 slots.

FIG. 4 shows the (T–N) curve and the (T–i) curve of the DC motor in the unipolar drive method (shown by U in the figure) and the bipolar drive method (shown by B in the figure). In the example of the (T–N) curve, the number of coil turns (windings) is halved in the unipolar drive method as compared to the bipolar drive method (see the excitation state of FIG. 5) and accordingly, the counter constant Ke is halved (as compared to the bipolar drive method), the piece of the N axis becomes larger and the inclination becomes almost vertical (see U of the T–N curve in FIG. 4). On the other hand, in the case of (T–i) curve, when the unipolar drive method is employed, Ke=Kt and Kt is halved. From the relationship with equation (2), the (T–i) curve becomes nearer to the vertical line (as compared to the curve B).

As is clear from the (T–N) curve in FIG. 4, when the load torque of FDB is at a low temperature of –20 degrees C., the B curve does not reach the stationary revolution number (such as 4200 rpm) but the U curve can assure the stationary revolution number with a margin. However, when the unipolar drive method is employed, the drive current becomes twice as much.

That is, from the viewpoint of the coil turns (windings), if the bipolar drive method (B method) is 1, the unipolar method (U method) is ½. From the viewpoint of Ke (Kt), if the B method is 1, the U method is ½. From the viewpoint of the drive current, if the B method is 1, the U method is 2. In the (T–N) curve in FIG. 4, the B method and the U method show the tendency as shown because of the following. When equation (3) is referenced, the U method as compared to the B method has inclination R/(Kt·Ke) equal to (⅔)/(½×½=¼)=8/3 (about 2.7) and 1/Ke in the piece of the N axis becomes 1/(½)=2. It should be noted that R is ½ if only the coil is taken into consideration but it is assumed to be ⅔ including the circuit resistance.

Next, explanation will be given on the switch control circuit for switching between the B method and the U method shown in FIG. 7 (the coil structure of the motor itself is the same regardless of the B method and the U method). FIG. 7 shows a control circuit for current control of the U-phase, V-phase, and W-phase along the time in the B method and the U method shown in FIG. 5A and FIG. 5B. In FIG. 7, Sc is a switch for switching between the B method and the U method. The switch is ON if the U method and OFF if the B method is employed. Furthermore, S1 to S6 are switches for applying Vcc to each of the phases and grounding to GND and perform current control along the time shown in FIG. 5A and FIG. 5B. The operation of the switches Sc, S1 to S6 can be performed by a microcomputer. For example, in case of (1) in the bipolar drive method in FIG. 5A and FIG. 5B, the Sc is turned OFF and only the S1 and S4 are turned ON. In the case of unipolar drive method, the Sc is turned ON and the S1, S3, and S5 are successively turned ON.

Next, the existing temperature detection means built in the magnetic disk apparatus can be utilized for switching the drive method between the low temperature mode and the normal temperature mode. That is, in the magnetic disk apparatus, the operation guarantee temperature is defined upon data write and if this temperature is exceeded, write is inhibited. For this, the temperature detection means is provided. In this embodiment, by using this existing temperature detection means and the detection output, the motor drive method can be selected. It should be noted that the bipolar drive method is set in when the temperature exceeds 5 degrees C. for example, although depending on the FDB rotation load. Moreover, the switching of the drive method need not be decided only by the temperature of the magnetic disk apparatus. By monitoring the current during unipolar drive (load fluctuation detection method), the bipolar drive method may be set in when the current is lowered. Explanation has been given on the 3-phase Y-connection motor but a multi-phase Y-connection motor may also be used.

Moreover, in the embodiment of the present invention, upon start of the magnetic disk apparatus, the temperature detection means detects the environmental temperature. If the detected temperature is lower than a predetermined temperature, the unipolar drive method is selected. Temperature detection is repeated at an appropriate time interval and when the predetermined temperature is exceeded, the bipolar drive method is set in. The temperature of the magnetic disk apparatus is monitored all the time or at a predetermined time interval and when the temperature is lowered, the unipolar drive method is set in.

Moreover, in the embodiment of the present invention, it is possible to use the Y-connection spindle motor having a middle point and employed currently as it is by adding a transistor as a switching element and adding the motor drive control timing control.

As has been described above, in the present invention, the Y-connection motor is used as follows. At a low temperature, the motor is driven by the unipolar drive method having a low counter constant so as to assure stationary rotation. During the stationary rotation, the temperature is monitored and when the temperature has increased, the mode is switched to the bipolar drive method. If the temperature is high (detected by the detection output of the temperature detection means) at start of the magnetic disk apparatus, the bipolar drive method can be used from the operation start.

According to the present invention, it is possible to generate torque required for stationary rotation at a low temperature and reduce power consumption during a normal rotation at a normal temperature. That is, it is possible to assure the stationary rotation at a low temperature (increase of torque generation) and to reduce the power consumption at a normal temperature.

Having described a preferred embodiment of the invention with reference to the accompanying drawings, it is to be understood that the invention is not limited to the embodiments and that various changes and modifications could be effected therein by one skilled in the art without departing from the spirit and scope of the invention as defined in the appended claims.

What is claimed is:

1. A motor control method for a magnetic disk drive comprising a magnetic disk as an information recording medium, a magnetic head for recording/reproducing information to/from the magnetic disk, and a motor for driving the magnetic disk, the motor having a connection point connecting middle points in a multi-phase Y-connection and capable of realizing a unipolar drive method for successively exciting phases and a bipolar drive method for simultaneously exciting two adjacent phases, wherein the unipolar drive method is selected when the temperature in the magnetic disk drive is lower than a predetermined temperature and the bipolar drive method is selected when the temperature exceeds the predetermined temperature.

2. A motor control method for the magnetic disk drive according to claim 1, wherein stationary rotation of the motor is assured by selecting the unipolar drive method or the bipolar drive method.

3. A motor control method for the magnetic disk drive according to claim 2, wherein the motor uses a fluid dynamic bearing (FDB).

4. A motor control method for the magnetic disk drive according to claim 2, wherein temperature detection means is provided inside or outside the magnetic disk drive and temperature detection by the temperature detection means is performed upon start of the magnetic disk drive to determine whether the temperature is in a predetermined range so that the motor drive method is switched according to the detection result and after the start, temperature detection is performed at a predetermined interval.

5. A motor control method for the magnetic disk drive according to claim 4, wherein the motor uses a fluid dynamic bearing (FDB).

6. A motor control method for the magnetic disk drive according to claim 1, wherein temperature detection means is provided inside or outside the magnetic disk drive and temperature detection by the temperature detection means is performed upon start of the magnetic disk drive to determine whether the temperature is in a predetermined range so that the motor drive method is switched according to the detection result and after the start, temperature detection is performed at a predetermined interval.

7. A motor control method for the magnetic disk drive according to claim 6, wherein the motor uses a fluid dynamic bearing (FDB).

8. A motor control method for the magnetic disk drive according to claim 1, wherein the motor uses a fluid dynamic bearing (FDB).

* * * * *